US012738557B2

(12) United States Patent
Lee et al.

(10) Patent No.: US 12,738,557 B2
(45) Date of Patent: Sep. 15, 2026

(54) BATTERY PACK AND DEVICE INCLUDING THE SAME

(71) Applicant: LG Energy Solution, Ltd., Seoul (KR)

(72) Inventors: Youngho Lee, Daejeon (KR); Junkyu Park, Daejeon (KR); Soo Youl Kim, Daejeon (KR); Seung Ryul Baek, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 663 days.

(21) Appl. No.: 17/435,586

(22) PCT Filed: Jun. 2, 2020

(86) PCT No.: PCT/KR2020/007106
§ 371 (c)(1),
(2) Date: Sep. 1, 2021

(87) PCT Pub. No.: WO2020/262832
PCT Pub. Date: Dec. 30, 2020

(65) Prior Publication Data

US 2022/0158270 A1 May 19, 2022

(30) Foreign Application Priority Data

Jun. 25, 2019 (KR) ........................ 10-2019-0075829

(51) Int. Cl.
*H01M 10/653* (2014.01)
*H01M 10/613* (2014.01)
(Continued)

(52) U.S. Cl.
CPC ....... *H01M 10/653* (2015.04); *H01M 10/613* (2015.04); *H01M 10/625* (2015.04);
(Continued)

(58) Field of Classification Search
CPC ............. H01M 10/613; H01M 10/625; H01M 10/647; H01M 10/653; H01M 10/6551; H01M 50/209; H01M 2220/20
See application file for complete search history.

(56) References Cited

U.S. PATENT DOCUMENTS 10,236,134 B1 * 3/2019 Nachman ............ H01M 10/617
2011/0090614 A1 4/2011 Guerin et al.
(Continued)

FOREIGN PATENT DOCUMENTS

CN 102856516 A 1/2013
CN 104078720 A 10/2014
(Continued)

OTHER PUBLICATIONS

Extended European Search Report including Written Opinion for Application No. 20833499.5 dated Mar. 1, 2022, pp. 1-7.
(Continued)

*Primary Examiner* — Armindo Carvalho, Jr.
(74) *Attorney, Agent, or Firm* — Lerner David LLP

(57) ABSTRACT

A battery pack according to an embodiment of the present disclosure includes a battery module having a cell stack in which one or more battery cells are stacked and a module frame for accommodating the cell stack therein; a pack frame accommodating the battery module therein; and a thermally conductive resin layer located between a lower surface of the module frame and the pack frame. An open portion is formed on the lower surface of the module frame, so that the cell stack is in contact with the thermally conductive resin layer.

11 Claims, 4 Drawing Sheets

(51) Int. Cl.

*H01M 10/625* (2014.01)
*H01M 10/647* (2014.01)
*H01M 10/6551* (2014.01)
*H01M 50/209* (2021.01)

(52) U.S. Cl.

CPC ..... *H01M 10/647* (2015.04); *H01M 10/6551* (2015.04); *H01M 50/209* (2021.01); *H01M 2220/20* (2013.01)

(56) References Cited

U.S. PATENT DOCUMENTS

2012/0141851 A1* 6/2012 Hou .................... H01M 50/222 429/96
2012/0263983 A1* 10/2012 Yoon .................. H01M 50/204 429/82
2013/0004822 A1* 1/2013 Hashimoto ....... H01M 10/6554 429/120
2014/0011059 A1 1/2014 Hashimoto et al.
2014/0023906 A1 1/2014 Hashimoto et al.
2014/0234691 A1* 8/2014 Lee .................. H01M 10/6567 429/120
2014/0295241 A1 10/2014 Tao et al.
2016/0141571 A1 5/2016 Adachi et al.
2016/0197386 A1 7/2016 Moon et al.
2017/0301969 A1 10/2017 Dudley et al.
2018/0019508 A1 1/2018 Lee et al.
2018/0138563 A1 5/2018 Behm et al.
2018/0366794 A1 12/2018 Kim et al.
2019/0067656 A1 2/2019 Zhang et al.
2019/0157729 A1* 5/2019 Yamashita .......... H01M 10/625
2020/0067156 A1 2/2020 Chi et al.
2020/0153059 A1* 5/2020 Lee .................... H01M 10/647
2020/0251789 A1 8/2020 Park et al.
2020/0259137 A1 8/2020 Yao et al.

FOREIGN PATENT DOCUMENTS

CN 105390636 A 3/2016
CN 105493309 A 4/2016
CN 106025423 A 10/2016
CN 108028444 A 5/2018
CN 108075075 A 5/2018
CN 108475832 A 8/2018
CN 109428025 A 3/2019
CN 109802063 A 5/2019
EP 2541668 A1 1/2013
EP 2843727 A1 3/2015
EP 3327855 A1 5/2018
EP 3352290 A1 7/2018
JP 2011508366 A 3/2011
JP 2013012441 A 1/2013
JP 2013125617 A 6/2013
JP 2013175360 A 9/2013
JP 2013229180 A 11/2013
JP 2015053276 A 3/2015
JP 2016025037 A 2/2016
JP 2016213104 A 12/2016
JP 2017188375 A 10/2017
JP 2017191755 A 10/2017
JP 2019096387 A 6/2019
KR 20150025236 A 3/2015
KR 20170019041 A 2/2017
KR 20180047383 A 5/2018
KR 20190006451 A 1/2019
WO 2012133707 A1 10/2012
WO 2012133708 A1 10/2012
WO 2013161427 A1 10/2013
WO 2018062172 A1 4/2018
WO 2018186566 A1 10/2018
WO 2019070819 A1 4/2019

OTHER PUBLICATIONS

International Search Report for Application No. PCT/KR2020/007106 mailed Sep. 28, 2020, pp. 1-3.
Search Report dated Sep. 11, 2023 from the Office Action for Chinese Application No. 202080032135.X issued Sep. 14, 2023, 3 pages. (see p. 2, categorizing the cited references).

* cited by examiner

【FIG. 1】
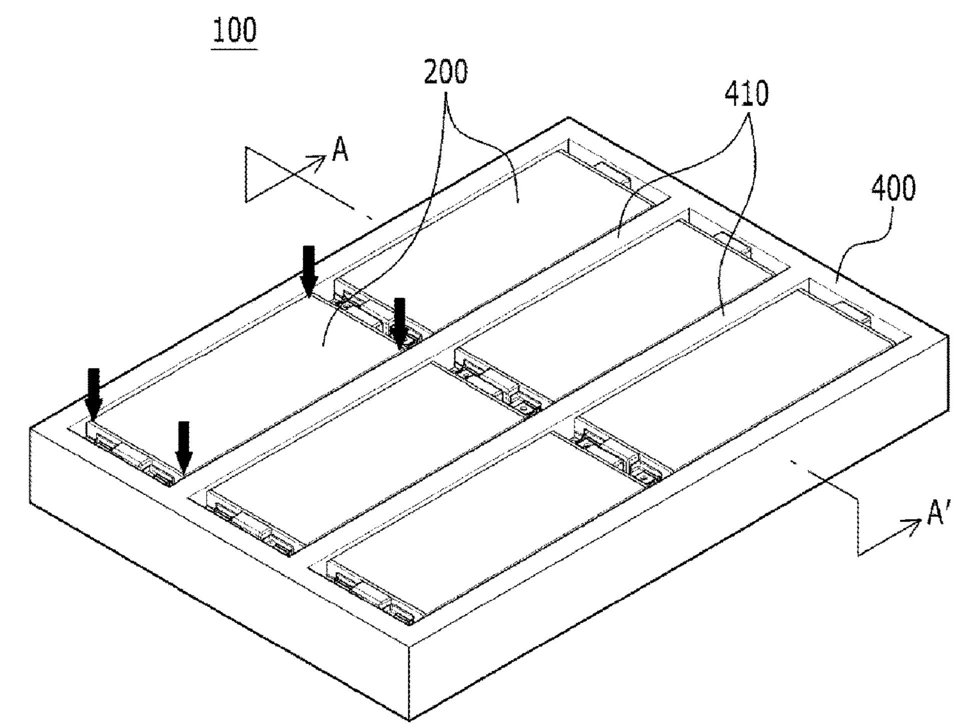
【FIG. 2】
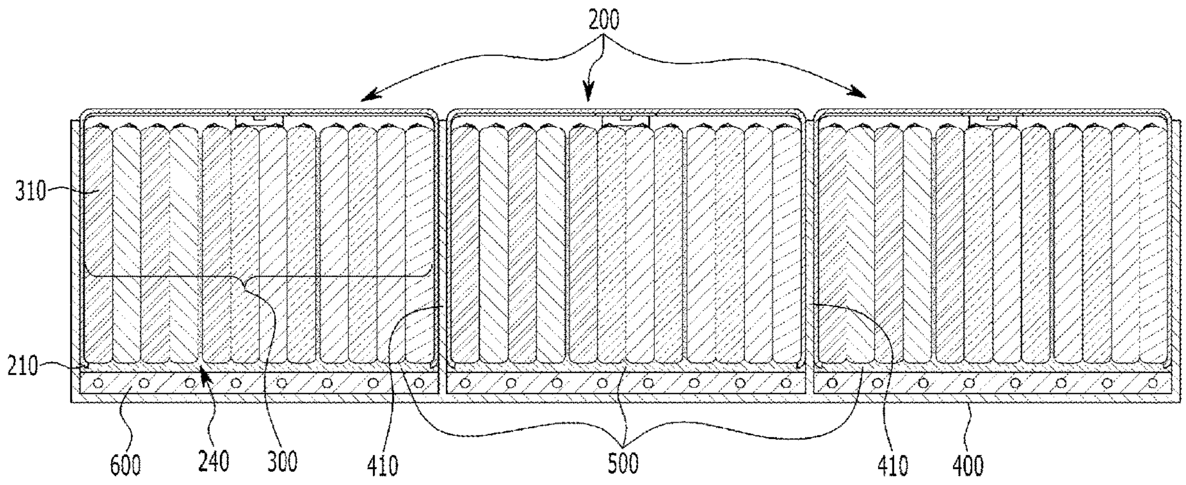

【FIG. 3】
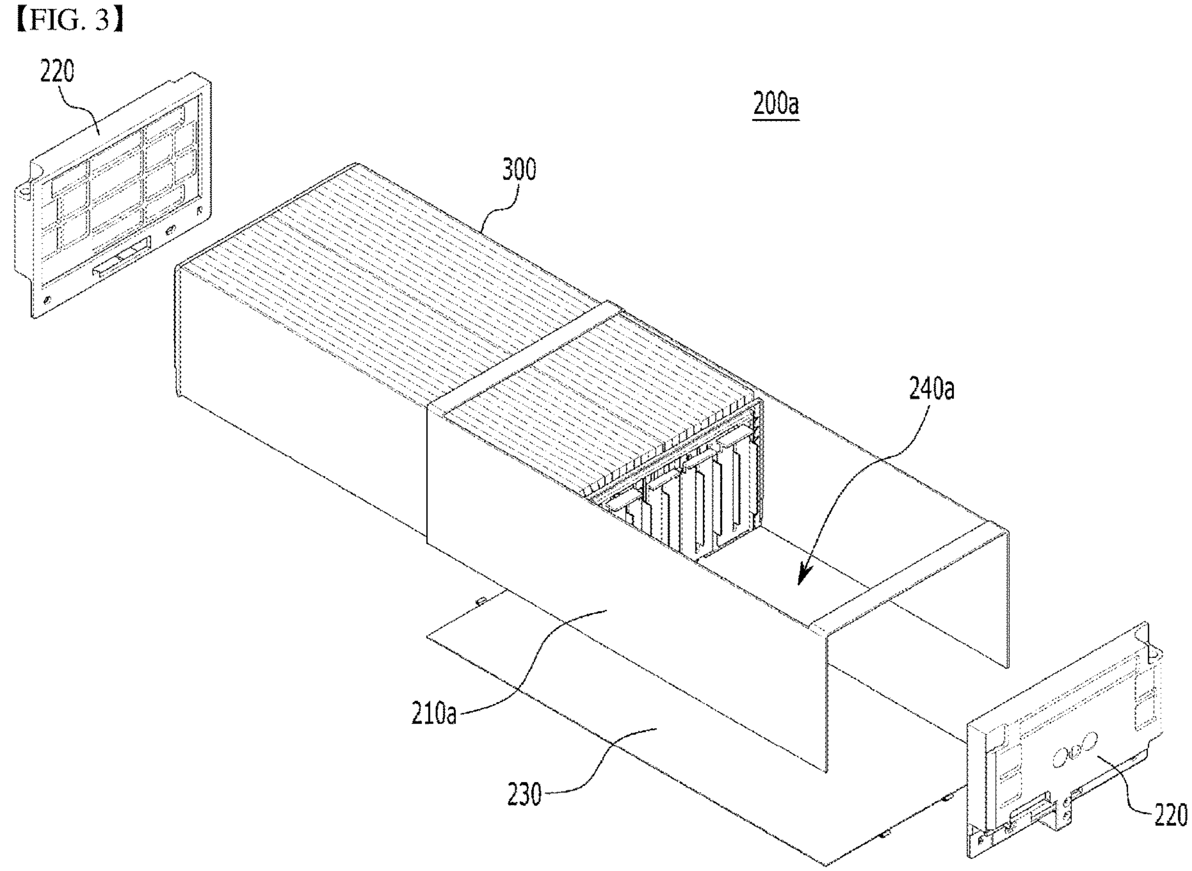

【FIG. 4】
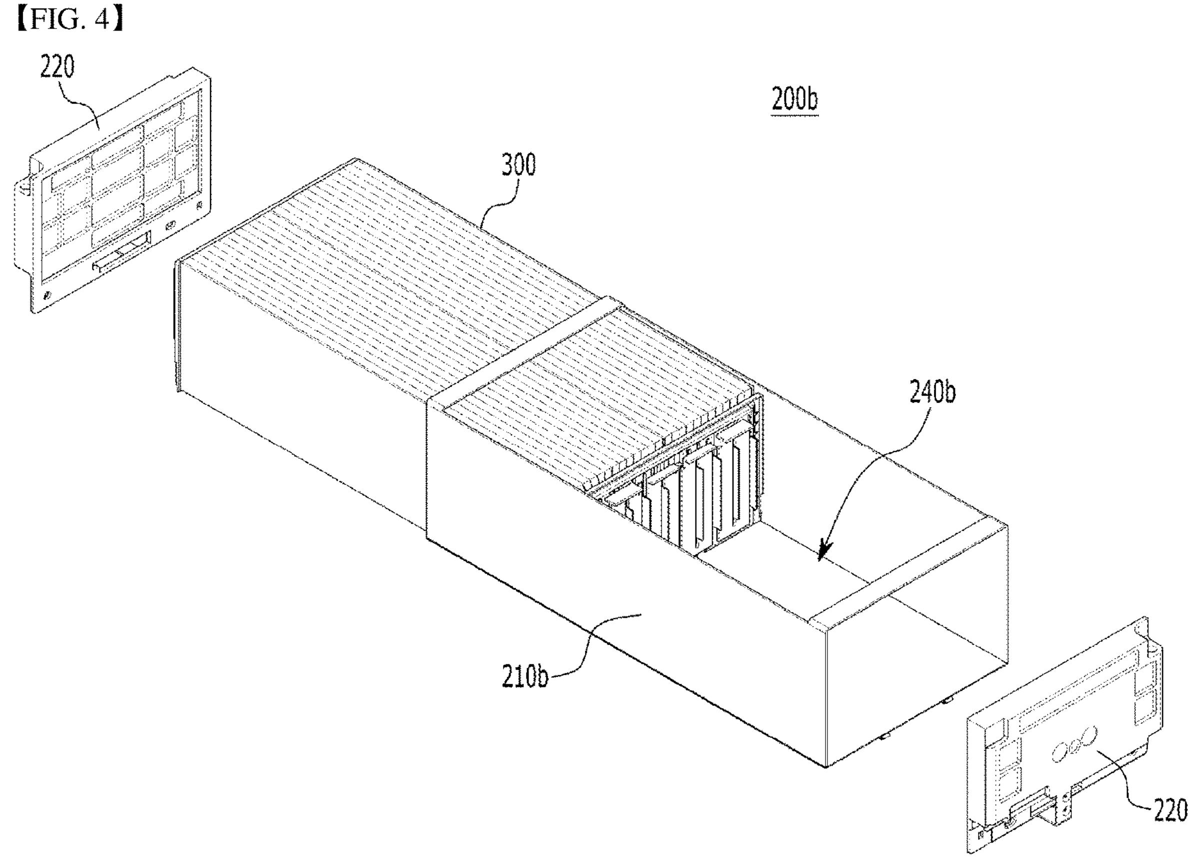

【FIG. 5】
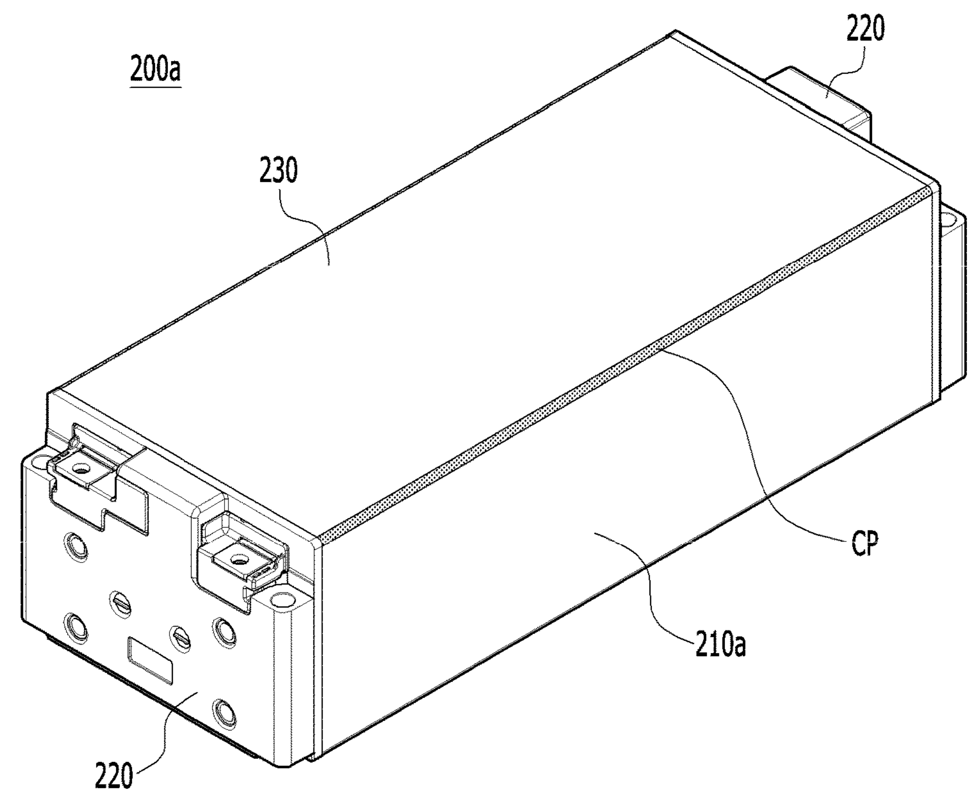
【FIG. 6】
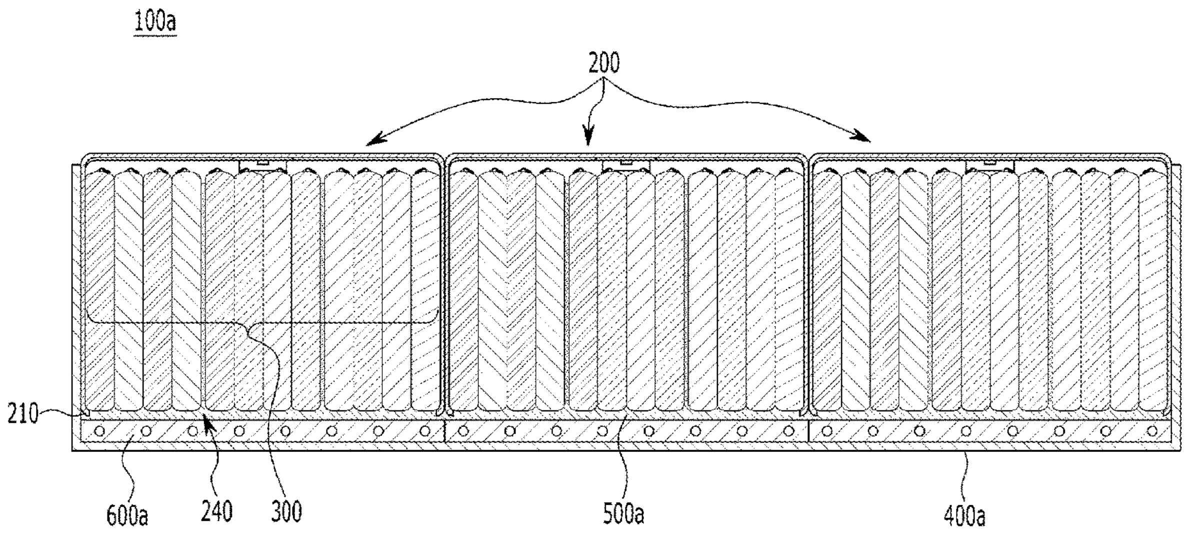

BATTERY PACK AND DEVICE INCLUDING THE SAME

CROSS-REFERENCE TO RELATED APPLICATIONS

This application is a national phase entry under 35 U.S.C. § 371 of International Application No. PCT/KR2020/007106 filed on Jun. 2, 2020, which claims priority from Korean Patent Application No. 10-2019-0075829 filed on Jun. 25, 2019, the disclosure of which is incorporated herein by reference in its entirety.

TECHNICAL FIELD

The present disclosure relates to a battery pack and a device including the same, and more particularly, to a battery pack including one or more battery modules and a device including the same.

BACKGROUND ART

In modern society, as portable devices such as mobile phones, notebook computers, camcorders and digital cameras have been daily used, the development of technologies in the fields related to mobile devices as described above has been activated. In addition, rechargeable batteries are used as a power source for electric vehicles (EV), hybrid electric vehicles (HEV), plug-in hybrid electric vehicles (P-HEV) and the like, in an attempt to solve air pollution and the like caused by existing gasoline vehicles using fossil fuel, and therefore, there is an increasing need for development of the secondary battery.

Currently commercialized secondary batteries include nickel cadmium batteries, nickel hydrogen batteries, nickel zinc batteries, and lithium secondary batteries. Among them, lithium secondary batteries have come into the spotlight because they have advantages, for example, hardly exhibiting memory effects compared to nickel-based secondary batteries and thus being freely charged and discharged, and having very low self-discharge rate and high energy density.

Such lithium secondary batteries mainly use a lithium-based oxide and a carbonaceous material as a positive electrode active material and a negative electrode active material, respectively. A lithium secondary battery includes an electrode assembly in which a positive electrode plate and a negative electrode anode plate respectively coated with the positive electrode active material and the negative electrode active material are disposed with a separator being interposed between them, and an exterior material, i.e., battery case, which seals and accommodates the electrode assembly together with an electrolyte.

Generally, lithium secondary batteries may be classified based on the shape of the exterior material into a can type secondary battery in which the electrode assembly is embedded in a metal can, and a pouch-type secondary battery in which the electrode assembly is embedded in a pouch of an aluminum laminate sheet.

In the case of a secondary battery used for a small-sized device, two to three battery cells are arranged, but in the case of a secondary battery used for a medium to large-sized device such as an automobile, a battery module in which a large number of battery cells are electrically connected is used. In such a battery module, a plurality of battery cells are connected to each other in series or parallel to form a cell stack, thereby improving capacity and output. In addition, one or more battery modules may be mounted together with various control and protection systems such as a battery management system (BMS) and a cooling system to form a battery pack.

When a secondary battery rises higher than an appropriate temperature, the secondary battery may undergo performance deterioration, and in the worst case, may explode or catch fire. In particular, in a battery module or a battery pack provided with a plurality of secondary batteries, that is, battery cells, the temperature may rise more quickly and drastically due to buildup of heat emitted from the plurality of battery cells in a small space. In other words, in the case of a battery module in which a plurality of battery cells is stacked and a battery pack equipped with such a battery module, high output can be obtained, but it is not easy to remove heat generated from the battery cells during charging and discharging. If the heat dissipation of the battery cell is not properly performed, the deterioration of the battery cell will be accelerated and the life will be shortened, and the possibility of explosion or ignition will increase.

Moreover, a battery module included in a vehicle battery pack is often exposed to direct sunlight and to high-temperature conditions such as the summer season or a desert region.

Therefore, when configuring a battery module or a battery pack, it may be very important to stably and effectively ensure the cooling performance. Thus, a thermal pad or a heat sink is used as a cooling means of the battery pack for discharging the heat generated from the battery cell to the outside, but due to a complicated structure connected to a battery cell and a battery module, a battery module and a battery pack, etc., there exist factors that disturb the cooling performance, such as an air gap, which causes problems that make effective cooling difficult.

In addition, since other demands for battery packs such as downsizing, securing rigidity, and increasing capacity also continue to apply, it may be substantially necessary to develop a battery module capable of satisfying these various requirements while improving the cooling performance.

DETAILED DESCRIPTION OF THE INVENTION

Technical Problem

Embodiments of the present disclosure are designed to solve the problems as described above, and therefore, an object of the present disclosure is to provide a battery pack having increased capacity and output as well as cooling performance, and a device including the same.

However, the problem to be solved by embodiments of the present disclosure is not limited to the above-described problems, and can be variously expanded within the scope of the technical idea included in the present disclosure.

Technical Solution

A battery pack according to an embodiment of the present disclosure includes at least one battery module including a cell stack in which one or more battery cells are stacked and a module frame for accommodating the cell stack; a pack frame accommodating the battery module; and a thermally conductive resin layer located between a lower surface of the module frame and the pack frame, wherein an open portion is formed on the lower surface of the module frame, so that the cell stack is in contact with the thermally conductive resin layer.

The thermally conductive resin layer may include a thermally conductive adhesive material.

The thermally conductive resin layer may be in a form in which the thermally conductive resin is solidified while being in contact with the cell stack.

The battery pack may further include a heat sink located between the thermally conductive resin layer and a bottom portion of the pack frame.

At least one of the module frame may be a U-shaped frame, and the open portion may be formed on a lower surface of the U-shaped frame.

A cover may be located on an upper surface of the U-shaped frame, and the U-shaped frame and the cover may be weld-connected to form a connection portion.

At least one of the module frame may be a mono frame having an open front and a rear surface, and the open portion may be formed on a lower surface of the mono frame.

The at least one battery module may comprise two or more battery modules.

The pack frame may include a partition wall formed between side surfaces of the battery modules.

The side surfaces of the battery modules may be in close contact with the partition wall.

The battery modules disposed along the side direction of the battery module may have side surfaces in close contact with each other.

The one or more battery cells may be stacked upright or in an inverted form, so as to be parallel to both sides of the module frame, and each of the one or more battery cells may be in contact with the thermally conductive resin layer.

The open portion may be spaced apart from each of the front and rear surfaces of the module frame.

The open portion may be adjacent to both side surfaces of the module frame.

Advantageous Effects

According to embodiments of the present disclosure, it is possible to provide a battery pack having improved cooling performance by reducing the factors that disturb cooling, through an exposed structure of a battery cell formed in a module frame of a battery module.

In addition, since it is not necessary to doubly arrange a heat transfer member inside the battery pack, cost can be reduced, and quality inspection thereof can be reduced to one, thereby simplifying the process and reducing process cost.

Further, by reducing the volume of the battery pack, it is advantageous for downsizing, and it is possible to increase the capacity and output of the battery pack even if the size is the same.

DETAILED DESCRIPTION OF THE EMBODIMENTS

FIG. 1 is a perspective view of a battery pack according to an embodiment of the present disclosure.

FIG. 2 is a cross-sectional view taken along line A-A' of FIG. 1.

FIG. 3 is an exploded perspective view of a battery module including a U-shaped frame.

FIG. 4 is an exploded perspective view of a battery module including a mono frame.

FIG. 5 is a perspective view of the battery module of FIG. 3.

FIG. 6 is a cross-sectional view illustrating a battery pack according to another embodiment of the present disclosure.

DETAILED DESCRIPTION OF THE EMBODIMENTS

Hereinafter, various embodiments of the present disclosure will be described in detail with reference to the accompanying figures so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, regions, etc. are exaggerated for clarity. In the figures, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a part is referred to as "including" or "comprising" a certain component, it means that it can further include other components, without excluding the other components, unless otherwise stated.

FIG. 1 is a perspective view of a battery pack 100 according to an embodiment of the present disclosure.

Referring to FIG. 1, a battery pack 100 according to an embodiment of the present disclosure includes a battery module 200 and a pack frame 400 accommodating the battery module 200. Although six battery modules 200 are accommodated in FIG. 1, the number of the battery modules is not limited, and one or more battery modules 200 may be accommodated in the pack frame 400, if necessary.

FIG. 2 is a cross-sectional view taken along line A-A' of FIG. 1.

Referring to FIG. 2, the battery module 200 includes a cell stack 300 in which one or more battery cells 310 are stacked, and a module frame 210 accommodating the cell stack 300. A thermally conductive resin layer 500 is located between the pack frame 400 and the lower surface of the module frame 210, and an open portion 240 is formed on the lower surface of the module frame 210, so the cell stack 300 may make contact with the thermally conductive resin layer 500. In addition, a heat sink 600 may be located between the thermally conductive resin layer 500 and a bottom portion of the pack frame 400.

Hereinafter, the open portion 240 formed on the lower surface of the module frame 210 will be described with reference to FIGS. 3 and 4. FIGS. 3 and 4 are exploded perspective views of battery modules 200*a* and 200*b* applicable to embodiments of the present disclosure. Specifically, FIG. 3 is an exploded perspective view of a battery module 200*a* including a U-shaped frame 210*a*, and FIG. 4 is an exploded perspective view of a battery module 200*b* including a mono frame 210*b*. In addition, both FIG. 3 and FIG. 4 show a state in which the battery modules 200*a* and 200*b* are turned over such that the bottom surface is looking upward, for convenience of description.

The module frame 210 of FIG. 2 is a metal plate, and a U-shaped frame or a mono frame may be applied, and the battery module 200*a* of FIG. 3 is when a U-shaped frame is applied, and the battery module 200*b* of FIG. 4 is when a mono frame is applied.

Referring to FIG. 3, the battery module 200*a* according to the present embodiment may include a U-shaped frame 210*a* accommodating the cell stack 300. The U-shaped frame 210*a* has a form in which an upper surface, a front surface, and a rear surface are open, and a cover 230 may be connected to the open surface, and an end plate 220 may be connected to the open front and rear surfaces.

At this time, as mentioned above, the open portion 240*a* is formed on the lower surface of the U-shaped frame 210*a* so that the cell stack 300 is exposed through the open portion 240*a*.

Referring to FIG. 4, the battery module 200*b* of the present embodiment may include a mono frame 210*b* accommodating the cell stack 300. The mono frame 210*b* has a form in which front and rear surfaces are open, and an end plate 220 may be connected to the open front and rear surfaces.

Likewise, an open portion 240*b* is formed on the lower surface of the mono frame 210*b* so that the cell stack 300 is exposed through the open portion 240*b*.

Referring back to FIGS. 2 to 4, through the open portions 240, 240*a*, and 240*b* formed on the lower surface of the module frame 210, that is, the U-shaped frame 210*a* or the mono frame 210*b*, the cell stack 300 is in contact with the thermally conductive resin layer 500. Heat generated from the battery cell 310 of the cell stack 300 may be transferred through the thermally conductive resin layer 500 and the heat sink 600 located under the thermally conductive resin layer 500.

If the open portions 240, 240*a*, and 240*b* are not formed, it is inevitable that a heat transfer member such as the thermally conductive resin layer 500 would be doubly arranged between the cell stack 300 and the module frame 210, and between the module frame 210 and the heat sink 600. This is because all air gaps between the battery cell and the battery module, and the battery module and the battery pack must be removed for heat transfer.

However, in the present embodiment, since the open portions 240, 240*a*, and 240*b* are formed, it is not necessary to doubly arrange the thermally conductive resin layer 500. Accordingly, cost can be reduced, and quality inspection of the interface of the heat transfer member can be reduced to one, thereby simplifying the process and reducing process cost.

In addition, the height of the battery pack 100 may be reduced compared to the situation in which the thermally conductive resin layers are doubly arranged. In general, when the battery pack is located on the floor of the vehicle, there is a great limitation on the height direction, but the battery pack 100 according to the present embodiment has the advantage of reducing the height limitation.

From another perspective, in a limited space, since the volume of the battery cell 310 may increase as much as the number of thermally conductive resin layers decreases, there is an effect of improving capacity and output of the battery pack 100.

In addition, if the open portions 240, 240*a*, 240*b* are not formed, since double heat transfer members would be located between the cell stack 300 and the heat sink 600, and a module frame would be located between the double heat transfer members, it is difficult to effectively transfer heat generated from the battery cell 310. This is because the module frame itself may deteriorate the heat conduction properties, and a fine air layer that may be formed between the module frame and the double heat transfer member may also be a factor of deteriorating the heat conduction properties. In contrast, because the open portions 240, 240*a*, and 240*b* in the present embodiment can simplify the heat transfer path between the cell stack 300 and the heat sink 600 into a single thermally conductive resin layer 500, it is possible to increase the cooling performance of the battery pack 100.

Such a principle can be applied similarly even when the thermally conductive resin layer 500 is in direct contact with the bottom of the pack frame 400, without the configuration of the heat sink 600.

FIG. 5 is a perspective view of the battery module 200*a* of FIG. 3. However, unlike FIG. 3, FIG. 5 shows a combined state in which the upper surface is looking upward without being turned over.

Referring to FIG. 5 together with FIG. 3, a cover 230 may be connected to the open upper surface of the U-shaped frame 210*a*, and the cover 230 may have a single plate-shaped structure. The U-shaped frame 210*a* and the cover 230 may form a structure surrounding the cell stack 300 by being connected by welding or the like, in a state in which corresponding corner portions are in contact with each other. That is, the U-shaped frame 210*a* and the cover 230 may have a connection portion CP formed at an edge portion corresponding to each other by a coupling method such as welding.

Meanwhile, referring back to FIGS. 2 to 4, the thermally conductive resin layer 500 in the present embodiment may include a thermal resin, and in particular, may include a thermally conductive adhesive material. For example, it may include at least one of a silicone-based material, a urethane-based material, and an acrylic-based material, and in particular, it is preferable to include a urethane-based material.

Since the thermally conductive resin layer 500 includes a thermally conductive resin having excellent thermal conductivity, the heat transfer amount and heat transfer rate between the cell stack 300 and the heat sink 600 may be further increased.

Furthermore, the thermally conductive resin includes a thermally conductive adhesive material, which may be a material that is a liquid when applied, but solidifies after the cell stack 300 is stacked thereon through the open portions 240, 240*a*, 240*b*. Accordingly, the thermally conductive resin layer 500 may fix the cell stack 300 and the battery modules 200, 200*a* and 200*b* including the same, within the battery pack 100. That is, the thermally conductive resin layer 500 in the present embodiment not only improves heat dissipation properties for the cell stack 300 through the open portions 240, 240*a*, 240*b*, but also has the effect of effectively fixing the cell stack 300.

For the fixation as described above, it is preferable that the thermally conductive resin layer 500 has a peel strength of 400 g/cm or more when a peel test is performed. Further, it is preferable to have an adhesive strength of 1.4 MPa or more when a shear strength test is performed.

Referring back to FIG. 1, in order to fix the battery module 200 within the pack frame 400, fastening structures such as hooks or bolts may be formed at four corners (black arrows) of the battery module 200. This is to ensure safety against vibration or impact when the battery module 200 is applied to a device to be described later.

However, in the present embodiment, since the battery module 200 can be fixed within the battery pack 100 via the thermally conductive resin layer 500 in FIG. 2, a fastening structure such as a hook structure or a bolt may be located only at two or one of the four corners (black arrows) of the battery module 200, and in some cases, it is also possible to fix the battery module 200 only with the thermally conductive resin layer 500 without the fastening structure.

Meanwhile, referring back to FIGS. 1 and 2, the pack frame 400 may further include a partition wall 410 formed between side surfaces of the battery modules 200. When the battery pack 100 is applied to a device such as an automobile, such a partition wall 410 may support the battery pack 100 from an external impact, and may prevent the flow of the battery modules 200 within the battery pack 100. In addition, the side surfaces of the battery modules 200 may be in close contact with the partition wall 410 or may be spaced apart at a predetermined interval, but in order to obtain the above effect, it may be more preferable to form a structure in which the side surfaces of the battery modules 200 are in close contact with the partition wall 410 as shown in FIG. 2.

Meanwhile, FIG. 6 is a cross-sectional view illustrating a battery pack 100*a* according to another embodiment of the present disclosure. Referring to FIG. 6, the battery pack 100*a* may form a structure in which side surfaces of the battery modules 200 are in close contact with each other, including a pack frame 400*a* having no partition walls. That is, among the battery modules, the battery modules 200 arranged along the side direction may have a structure in close contact with each other via the side surfaces.

Other configurations are the same or similar to those of the battery pack 100 of FIGS. 1 and 2, so that the cell stack 300 of the battery module 200 is bonded with the thermally conductive resin layer 500*a* through the open portion 240 formed on the lower surface of the module frame 210, and a heat sink 600*a* may be located under the thermally conductive resin layer 500*a*. However, since the pack frame 400*a* is not provided with a partition wall, the battery modules 200 in close contact along the side surfaces may share one thermally conductive resin layer 500*a*, as shown in FIG. 6.

As mentioned above, since the thermally conductive resin layers 500 and 500*a* of FIGS. 2 and 6 can fix the cell stack 300 or the battery modules 200, 200*a*, 200*b*, separate fastening members for fixing such as bolts can be reduced or eliminated. Therefore, instead of the space required for a bolt or nut to be fastened, a structure can be formed in which the battery modules 200 are in close contact with the partition wall 410 as in FIG. 2, or a structure in which the battery modules 200 are in close contact with each other as in FIG. 6. Accordingly, since the battery module 200 may be compactly disposed, it may lead to a reduction in the volume of the battery packs 100 and 100*a* or an increase in battery capacity.

Referring back to FIG. 2, it is preferable that the battery cells 310 constituting the cell stack 300 are stacked in an upright or inverted manner so as to be parallel to both sides of the module frame 210. Through this, each of the battery cell 310 may be exposed to the open portion 240 to contact the thermally conductive resin layer 500.

Further, referring back to FIGS. 3 and 4, the open portions 240*a* and 240*b* may be spaced apart from the front and rear surfaces of the module frames 210*a* and 210*b*, respectively. That is, on the lower surfaces of the module frames 210*a* and 210*b*, portions in which the open portions 240*a* and 240*b* are not formed may be adjacent to the front and rear surfaces of the module frames 210*a* and 210*b*, respectively. If the open portions 240*a* and 240*b* are formed in all regions of the lower surface, in the process of manufacturing the battery modules 200*a* and 200*b* or in the process of assembling the battery pack, there may be a problem that the cell stack 300 or a part thereof is deviated. When considering the stacking shape and direction of the battery cell 310 mentioned above, by having the open portions 240*a* and 240*b* formed spaced apart from each of the front and rear surfaces of the module frames 210*a* and 210*b*, the cell stack 300 can be prevented from being deviated.

Meanwhile, the open portions 240*a* and 240*b* may be adjacent to both side surfaces of the module frames 210*a* and 210*b*. When considering the stacking shape and direction of the battery cell 310 mentioned above, the open portions 240*a* and 240*b* must be adjacent to both sides of the module frames 210*a* and 210*b*, in order for all of the battery cells including battery cells configuring both ends of the cell stack 300 to be in contact with the thermally conductive resin layer. Effective heat dissipation is possible only when all of the battery cells configuring the cell stack 300 are in contact with the thermally conductive resin layer.

The above-mentioned battery pack can be applied to various devices. Such a device may be applied to a vehicle such as an electric bicycle, an electric vehicle, or a hybrid vehicle, but the present disclosure is not limited thereto, and is applicable to various devices that can use a battery module.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery pack
200, 200*a*, 200*b*: battery module
210: module frame
300: cell stack
400: pack frame
500: thermally conductive resin layer
600: heat sink

The invention claimed is:

1. A battery pack comprising:

two or more battery modules, each of the battery modules including a cell stack in which one or more battery cells are stacked and a module frame accommodating the cell stack therein;

a pack frame accommodating the two or more battery modules therein such that a first side of the module frame of each of the two or more battery modules is positioned adjacent to a first side of the pack frame;

a heat sink disposed on the first side of the module frame so as to define a space between the cell stack and the heat sink, wherein the heat sink is accommodated in the pack frame; and one thermally conductive resin layer located in the space so as to directly contact the cell stack of each of the battery modules, the one thermally conductive resin layer conforming to the cell stack of each of the battery modules and to the heat sink by having solidified in the space from a flowable state while in contact with the cell stack and the heat sink, wherein the battery modules share the one thermally conductive resin layer, such that the cell stack in one of the battery modules and the cell stack in another of the battery modules are in contact with the one thermally conductive resin layer, wherein each module frame of the two or more battery modules is open along the respective first side such that the one thermally conductive resin layer makes direct contact with the one or more battery cells within the two or more battery modules, and wherein the heat sink is in direct contact with the one thermally conductive resin layer.

2. The battery pack of claim 1, wherein the thermally conductive resin layer comprises a thermally conductive adhesive material.

3. The battery pack of claim 1, wherein at least one of the module frame of the two or more battery modules is a U-shaped frame.

4. The battery pack of claim 3, wherein a cover is positioned on a second side of the U-shaped module frame, the second side of the module frame being an opposite side of the module frame from the first side of the module frame, and wherein the U-shaped frame is welded to the cover to define a connection portion.

5. The battery pack of claim 1, wherein at least one of the module frame of the two or more battery modules is a mono frame having first and second ends which are open, the first and second ends being on opposing sides of the module frame from one another and extending transverse to the first side of the module frame.

6. The battery pack of claim 1, wherein adjacent ones of the two or more battery modules have side surfaces that abut one another.

7. The battery pack of claim 1, wherein the one or more battery cells of the cell stack of each of the two or more battery modules are stacked along a direction parallel to the first side of the respective module frame such that each of the one or more battery cells is in contact with the thermally conductive resin layer.

8. The battery pack of claim 1, wherein the space defined between the cell stack and the heat sink terminates at locations spaced apart from respective first ends and second ends of each module frame, the first and second ends being on opposing sides of the module frame from one another and extending transverse to the first side of the module frame.

9. The battery pack of claim 1, wherein the space defined between the cell stack and the heat sink terminates at locations adjacent to respective opposing side surfaces of the module frame, the side surfaces extending transverse to the first side of the module frame.

10. A device comprising one or more of the battery pack of claim 1.

11. The battery pack of claim 1, wherein an entire length of the cell stack is in direct contact with the thermally conductive resin layer.

* * * * *